US010830786B2

(12) United States Patent
Djelassi (10) Patent No.: US 10,830,786 B2
(45) Date of Patent: Nov. 10, 2020

(54) PROCESSING METHOD FOR A ROTATION SPEED SIGNAL OF AN AIRCRAFT ENGINE SHAFT AFFECTED BY NOISE

(71) Applicant: Safran Aircraft Engines, Paris (FR)

(72) Inventor: Cedrik Djelassi, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 262 days.

(21) Appl. No.: 16/006,199

(22) Filed: Jun. 12, 2018

(65) Prior Publication Data
US 2018/0364271 A1 Dec. 20, 2018

(30) Foreign Application Priority Data

Jun. 14, 2017 (FR) ...................................... 17 55340

(51) Int. Cl.
*G01P 3/48* (2006.01)
*F02C 9/28* (2006.01)
(Continued)

(52) U.S. Cl.
CPC .............. *G01P 3/4802* (2013.01); *F02C 9/28* (2013.01); *G01P 3/488* (2013.01); *G01P 3/489* (2013.01);
(Continued)

(58) Field of Classification Search
CPC . G01M 1/22; G01M 1/24; G01M 1/32; F02C 9/28; F05D 2220/323; F05D 2270/80; G01P 3/4802; G01P 3/488; G01P 3/489
See application file for complete search history.

(56) References Cited

U.S. PATENT DOCUMENTS 4,287,480 A * 9/1981 Swift ...................... H03L 7/085
331/1 A
6,954,510 B2 * 10/2005 Lee ........................ H03L 7/095
375/354
(Continued)

FOREIGN PATENT DOCUMENTS

JP   59-180463 A   10/1984
JP   60-225066 A   11/1985
JP   60-225067 A   11/1985

OTHER PUBLICATIONS

Preliminary Search Report and Written Opinion dated Feb. 5, 2018 in corresponding French Patent Application No. 1755340 (with English Translation of Category of Cited Documents), citing documents AA, AB, AO, AP and AQ therein, 9 pages.

*Primary Examiner* — Elias Desta
(74) *Attorney, Agent, or Firm* — Oblon, McClelland, Maier & Neustadt, L.L.P.

(57) ABSTRACT

A processing method of an alternating signal produced by a variable reluctance sensor, including steps consisting of a raw window signal switching toward a low voltage level, respectively toward a high voltage level, calculation of a processed window signal using a value of the switching continuation duration calculated as a function of a value of shaft rotation speed, and based on the raw window signal, measurement of the shaft rotation speed, each switching of the processed window signal triggering the locking of the processed window signal, for a duration exactly equal to the switching continuation duration, so that the switches of the raw window signal are not translated into switches of the processed window signal during the locking, the processed window signal no longer being locked once the switching continuation duration has expired.

8 Claims, 7 Drawing Sheets

(51) Int. Cl.
*G01P 3/489* (2006.01)
*G01P 3/488* (2006.01)

(52) U.S. Cl.
CPC .... *F05D 2220/323* (2013.01); *F05D 2270/80* (2013.01)

(56) References Cited

U.S. PATENT DOCUMENTS

2007/0108969 A1    5/2007    Kurimoto et al.
2008/0197917 A1    8/2008    Delcol et al.

* cited by examiner

PROCESSING METHOD FOR A ROTATION SPEED SIGNAL OF AN AIRCRAFT ENGINE SHAFT AFFECTED BY NOISE

TECHNICAL FIELD OF THE INVENTION

The present invention relates to the measurement of the operating speed of rotating element of an aircraft engine, despite the existence of parasitic noise signals, produced by the activity of the engine.

PRIOR ART

For aircraft engines, it is important to dispose of accurate measurements of the rotation speed of the engine shaft. This information can control, for example, the cutoff or the regulation of the fuel supply to the engine, if the rotation speed or the acceleration exceed a predetermined value.

It is well known to measure the rotation speed of a shaft using a electromagnetic type sensor associated with a phonic wheel. Hereafter this will be called a phonic wheel sensor, or else a variable reluctance sensor. The phonic wheel being driven by the shaft, the rotational movement of the phonic wheel is a function of the rotational movement of the shaft. The sensor creates, using a winding, a magnetic field which closes, either in the air in the space between two teeth of the phonic wheel or on a tooth of the phonic wheel. An electromotive force is then generated at the terminal of the winding, proportional to the rotation speed of the phonic wheel. The frequency of the AC voltage thus generated is equal to the frequency of passage of the teeth of the phonic wheel, which is itself illustrative of the rotation speed of the shaft, and the amplitude is a function of the air gap and of the frequency of the signal. The Applicant has described, in the French patent application published under number WO 2014/207369, a toothed nut which can be screwed around a shaft of the low-pressure body of an aircraft turbine engine, integrating for example the shaft with a ball bearing. The teeth of this nut can cooperate with a rotation speed sensor operating using this principle, to supply a measurement of an operating speed of a rotating element of the engine. At least a portion of the teeth of this nut also include recesses, preserving the function of tightening the nut while also supplying a larger number of intervals of deficit in the part to allow an accurate measurement of the rotation speed of the shaft.

Phonic wheel systems for measuring rotation speed can in particular be used to measure the rotation speed N1 of the low-pressure body of a two-spool turbojet. In "direct drive" engines (direct driver of the fan by the low-pressure shaft), this operating speed N1 is also the operating speed of the fan. A phonic wheel sensor can also allow measurement of the rotation speed N2 of the high-pressure body of the two-spool turbojet, or the rotation speed of another rotating element of the engine.

One frequency measurement principle based on a sinusoidal detection signal of the shaft rotation speed, produced by a phonic wheel sensor (also called a variable-reluctance sensor) of the type described previously, is conventionally the following. The output sinusoidal signal of the sensor can be filtered a first time by an RC filter, then clipped, then filtered a second time, and finally transformed into a window signal by a hysteresis comparator (also called a "Schmidt trigger") having a drop (or restart) threshold at 0 and a rise (or reset) threshold at a predetermined voltage value. The "Schmidt trigger" gives at the output a window signal which commutes toward a high value when the input voltage exceeds the rise threshold, and which commutes toward a low value when the input voltage passed below the drop threshold. An engine control unit can then carry out a frequency measurement on the window signal obtained.

Figure 1:
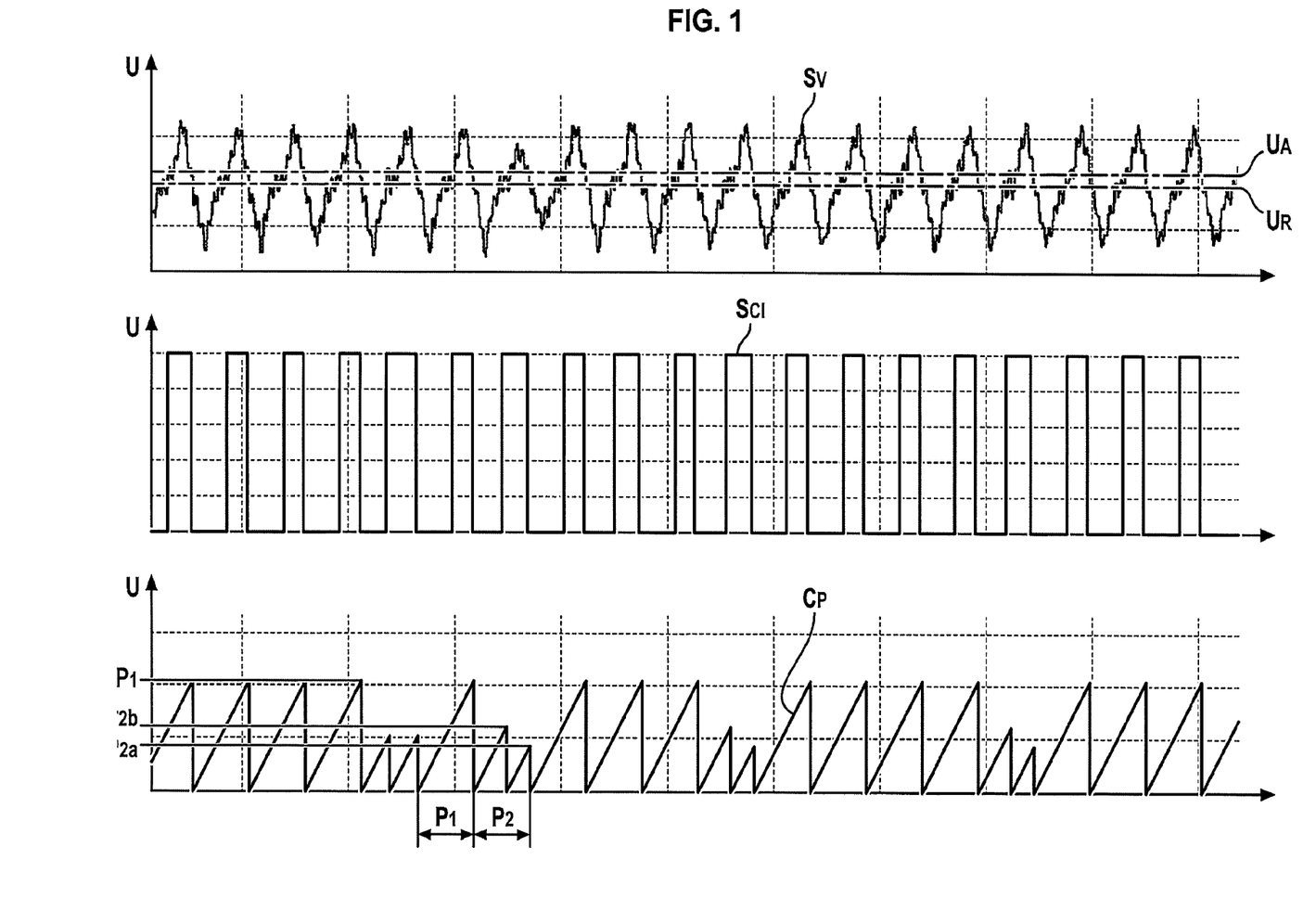

However, the sinusoidal signal allowing measurement of the operating speed N1, produced by a phonic wheel sensor, can be very noisy. Portions of the sensor can undergo electromagnetic perturbations, due to mechanical vibrations of certain portions of the engine. It is possible to observe intermittent noise occurrences, but also noise signals of the alternating type superimposed on the signal representing the rotation of the phonic wheel (useful signal). FIG. 1 includes a first abscissa axis illustrating the voltage $S_V$ at the terminals of the phonic wheel sensor over time, in the case of a signal altered by a parasitic noise of the alternating type with a frequency greater than that of the useful signal, and a second axis representing, as a function of time, the window signal obtained $S_{CI}$ (without post-processing) after windowing the voltage signal of the upper graphic. The peak-to-peak amplitude of the noise possibly being locally greater than the voltage difference between the restart threshold $U_R$ and the reset threshold $U_A$, the noise causes parasitic switches of the window signal. A third axis illustrates the variations of a counting signal $C_P$ of the successive periods of the window signal $S_{CI}$ over time. The specified time illustrated by the curve of this third axis is resumed here at each descending switching of the windows signal from the high level to the low level. For example, during the period $P_1$ illustrated in the figure, there will be no parasitic switching due to noise. On the other hand, over the following period $P_2$, the detected signal $S_V$ exceeds the reset threshold $U_A$, then again drops below the restart threshold $U_R$, due to the alternating parasitic noise superimposed on the useful signal. The elapsed time between these two threshold passages is much shorter than the period $P_1$, which causes rapid successive switches of the window signal $S_C$ obtained, and the detection, instead of a signal theoretical period $P_2$ of the windows signal which would have been obtained without parasitic switches, of two successive periods $P_{2a}$ and $P_{2b}$ for the window signal $S_{CI}$. The measurement of the rotation speed of the shaft is then perturbed.

Several solutions have already been considered to mitigate this problem and supply a less perturbed measurement of the shaft operating speed. One common solution is the application of a low-pass filter directly on the signal before windowing, with a cutoff frequency chosen so as to eliminate directly the alternating high-frequency noise. However, the elimination of a frequency near the frequency of the useful signal causes dephasing of the useful signal. This dephasing causes problems for certain possible uses of the measurement operational speed signal: in particular, the signal produced by the phonic wheel can be used for the function of engine balancing, if the phonic wheel is configured to supply an "impulse per revolution" allowing the elements of the engine to be keyed to the rotation of the shaft.

Moreover, low-pass filtration can reduce the measured amplitude of the useful signal, and increase the snapping threshold of the measurement (the threshold below which the rotation speed is not correctly measurable). This effect is the more disturbing, the higher the ratio between the peak-to-peak amplitude of the measurement noise and the peak-to-peak amplitude of the useful signal. This ratio can in particular be high when the operating speed measured is low, for example during the start-up phase of the engine.

Another solution of the prior art consists of increasing the difference between the restart threshold and the reset threshold of the "trigger" to produce the window signal. Thus, with equal amplitude of the parasitic alternating noise, this noise causes fewer parasitic switches of the window signal. Also known is a solution consisting of adapting the amplitude of the signal prior to windowing, to decrease the peak-to-peak noise amplitude with respect to the difference between the thresholds. Here too, however, the snapping threshold of the measurement is increased, and the accuracy of the measurement of the passage period of the teeth is affected, the more so if the ratio of the amplitude of the measurement noise and the amplitude of the useful signal is low.

A need therefore exists carry out windowing at the input of the engine computer, of the measured signal at the terminals of a phonic wheel sensor, capable of preventing undesirable switches due to parasitic noise of the high-frequency sinusoidal type, but without reducing the accuracy or the sensitivity of the operating speed measurement.

GENERAL PRESENTATION OF THE INVENTION

The invention proposes a solution for not taking into account the parasitic switches due to measurement noise, without however modifying either the signal to which windowing is applied or the restart and reset thresholds of the "Schmidt trigger."

One principle of the present invention is to block the switches of the window signal during a certain duration after each switching, by processing carried out downstream of the windowing and upstream of the measurement of the operating speed by the engine computer. When the measured signal exceeds a reset threshold, or passes below a restart threshold, and the window signal is commuted, said window signal is "blocked" for a switching continuation duration during which it is estimated that, even if the gradient of rotation speed of the teeth of the phonic wheel is at its maximum, this speed cannot reach a sufficient value to justify a new switching. This amounts to assuming that any new switching obtained after a first switching, during a duration less than the switching continuation duration previously calculated on the basis of a predictive law of the operating speed gradient, can result only from parasitic noise and must not be taken into account.

Thus, the invention relates, according to a first aspect, to a processing method of an alternating signal for detecting the rotation speed of a shaft of an aircraft engine, produced by a variable reluctance sensor and affected by parasitic measurement noise, from a raw window signal switching toward a low voltage level, respectively toward a high voltage level, in correspondence with the passage of the voltage of the alternating signal below a restart threshold, respectively above a reset threshold, the method comprising the following steps:
  calculation of a processed window signal, based on the raw window signal, and using a value of the switching continuation duration below which it is assumed that a non-noisy portion of the alternating signal will not cause a switching, said switching continuation duration being calculated as a function of a rotation speed value of the shaft obtained previously,
  measurement of the rotation speed of the shaft, by measurement of the frequency of the processed window signal,
wherein each switching toward the low level or toward the high level of the processed window signal triggers the locking of the processed window signal for a duration exactly equal to the switching continuation duration previously calculated, so that the switches of the un-processed window signal are not translated into switches of the processed window signal during said locking, the processed window signal no longer being locked once the switching continuation duration has expired.

Advantageously, but without limitation:
  the value of the switching continuation duration corresponds to a quarter of a minimum rotation period of the shaft at the time of measurement, said minimum period being calculated using a maximum gradient law of the rotation speed of the shaft.
  the maximum gradient of rotation speed of the shaft for a given period is a function of a rotation speed value obtained for a prior period.
  the alternating rotation speed detection signal is transformed into a window signal by a "Schmidt trigger."
  during an operating speed measurement initialization phase, a theoretical model of the engine operating speed is used to evaluate the switching continuation duration.

According to a second aspect, the invention relates to a rotation speed detection unit of an aircraft engine shaft, comprising:
  a phonic wheel driven in rotation by the shaft, and having a plurality of regularly spaced teeth,
  a variable-reluctance sensor placed in the vicinity of the phonic wheel, so that the passage of the teeth of the phonic wheel generates an alternating signal for detecting the rotation speed, a frequency of said alternating signal being proportional to the rotation speed of the shaft,
  an electronic circuit configured to carry out the windowing of the alternating signal into a raw window signal,
  a processing unit capable of implementing a method conforming to the preceding, to supply a processed window signal as an output.

Advantageously, but without limitation, the phonic wheel of the detection unit has a singular tooth, of which a shape and/or a dimension differs from the other teeth of the phonic wheel, allowing angular balancing points to be identified.

According to a third aspect, the invention relates to an aircraft engine comprising a rotating shaft of which the rotation speed is to be measured, such as a shaft of a low-pressure body of which the operating speed N1 is to be obtained, to which is associated a detection unit conforming to the preceding, comprising a phonic wheel screwed around the shaft, coaxial with the shaft.

GENERAL PRESENTATION OF THE FIGURES

FIG. 1 has already been previously described, in the introduction.

Features, objectives and advantages of the invention will be revealed by the description that follows, which is purely illustrative and not limiting, accompanied by the following supplementary figures:

DETAILED DESCRIPTION

In all the following, a processing method of a rotation speed measurement signal will be described, measured at the terminals of a phonic wheel sensor used for measuring the operating speed N1 of an engine. However, the same modalities of processing can also be advantageously used for measuring any other operating speed of a rotating element of the engine.

An alternating signal $S_V$ for detecting the rotation speed of the shaft of the low-pressure body (BP) of a two-spool turbojet is processed at the input of the engine computer (FADEC3 for example) to obtain a raw window signal $S_{CI}$, on which a frequency measurement, allowing an operating speed value N1 to be derived, can be accomplished. For example, the signal $S_V$ can be filtered by an RC filter, then clipped, then filtered again, and finally windowed by a "Schmidt trigger" with a restart threshold $U_R$ of 0 V and with a reset threshold $U_A$ of 0.232 V. A first counter counts the descending fronts of a sample window signal with a high frequency compared to that expected for the window signal $S_C$ (for example 547 kHz), and a second counter counts the descending fronts of the window signal $S_{CI}$, so as to determine the temporal period of the window signal $S_{CI}$.

Figure 2:
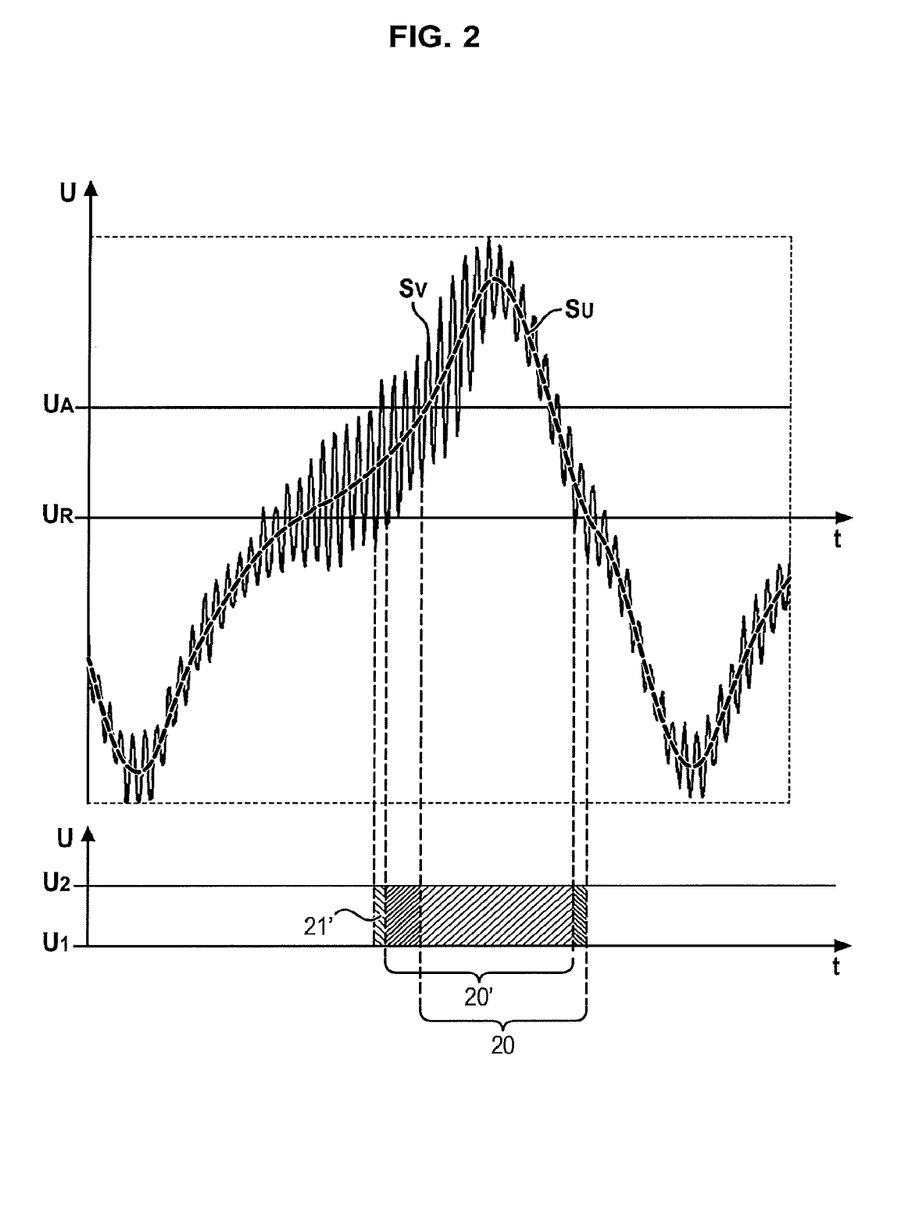
FIG. 2 illustrates, on an example of a noisy output signal of a phonic wheel sensor, erroneous detections of window signal period.

However, as seen previously, the raw window signal $S_{CI}$ can have switches which do not correspond to the rising or descending fronts for the useful portion of the operating speed detection signal, but which on the contrary are caused by a variation of voltage of an alternating parasitic noise (non-useful portion of the signal). This phenomenon is illustrated in FIG. 2. On a first axis, a theoretical voltage $S_V$ at the terminals of a phonic wheel sensor is represented as a function of time t. Also represented on the same axis is the useful portion $S_U$ of the signal, obtained theoretically by subtracting the signal $S_V$ of the contribution of the alternating parasitic noise. On a second time axis is superimposed a (raw) window signal associated with the signal $S_V$, and a (raw) window signal associated with the theoretical useful signal $S_U$, switching between a low level $U_1$ and a high level $U_2$. There is switching of these window signals toward the high level $U_2$ when the voltage of the non-windowed signal $S_V$ passes above the threshold $U_A$, and switching of these windowed signals toward the lower level $U_1$ when the voltage of the non-windowed signal passes below the threshold $U_R$.

It is observed, on the second axis, that in the absence of processing the noisy signal $S_V$ gives, after windowing, a rising front and a descending front corresponding to the portion 21', then a rising front and a descending front corresponding to the portion 20', while the useful signal $S_U$ gives, after windowing, a single rising front and a single descending front corresponding to the portion 20. In addition, the rising and descending fronts of the portion 20' are not in correspondence with the rising and descending fronts of the portion 20. Thus the detection of period (for example the period between two successive descending fronts of the window signal) is erroneous for the noisy signal $S_V$, with respect to the period obtained for the useful signal $S_U$, the latter being the measurement of interest because it is representative of the operating speed N1.

Given these problems linked with the presence of an alternating parasitic noise which, as explained in the introduction, are more disturbing, the higher the ratio of the peak-to-peak amplitude of the alternating parasitic noise to the peak-to-peak amplitude of the useful signal, a processing method of the alternating operating speed signal $S_V$ is implemented, obtained at the terminals of a phonic wheel sensor.

The signal processing of the description that follows is implemented within the engine computer (FADEC3 for example).

An algorithm is implemented within the computer, taking into account the raw window signal $S_{CI}$ obtained at the output of the "Schmidt trigger," with restart threshold $U_R$ and reset threshold $U_A$. The algorithm is, hereafter, implemented in a numerical processing card, using code instructions. As an alternative, a similar process to the algorithm described hereafter could be implemented in analog electronics.

The algorithm delivers a processed window signal $S_C$, more relevant with regard to the theoretical useful signal $S_U$ seen previously because it includes few or no parasitic switches due to noise extending beyond the thresholds $U_A$ and $U_R$ of the "Schmidt trigger." The frequency measurement accomplished on the processed window signal $S_C$ therefore makes more sense for measuring the operating speed N1 than a measurement accomplished on the raw window signal $S_{CI}$.

The principle of the processing method is as follows. It is assumed that the counting of the period of the window signal is initiated at each descending front. Starting at the end of a period $P_{n-1}$ (with a descending front). Using a predetermined maximum possible operating speed N1 gradient law, the maximum possible variation of operating speed is calculated, and the minimum value of the quarter of the following period $P_n$ is deduced from it. The value of the switching continuation duration $T_{Hn}$ along the period $P_n$ is set equal to this minimum value of the quarter period obtained, this throughout the entire period $P_n$.

The law used for the maximum operating speed N1 gradient is expressed, for example, as a function of the thermodynamic parameters of the engine, or the characteristic parameters of the engine operating speed. This law is determined in advance, empirically for example, by carrying out tests of extreme maneuvers (giving rise to high operating speed gradients). This law can be materialized by nomograms giving the maximum gradient over a plurality of operating points of the engine.

Figure 3:
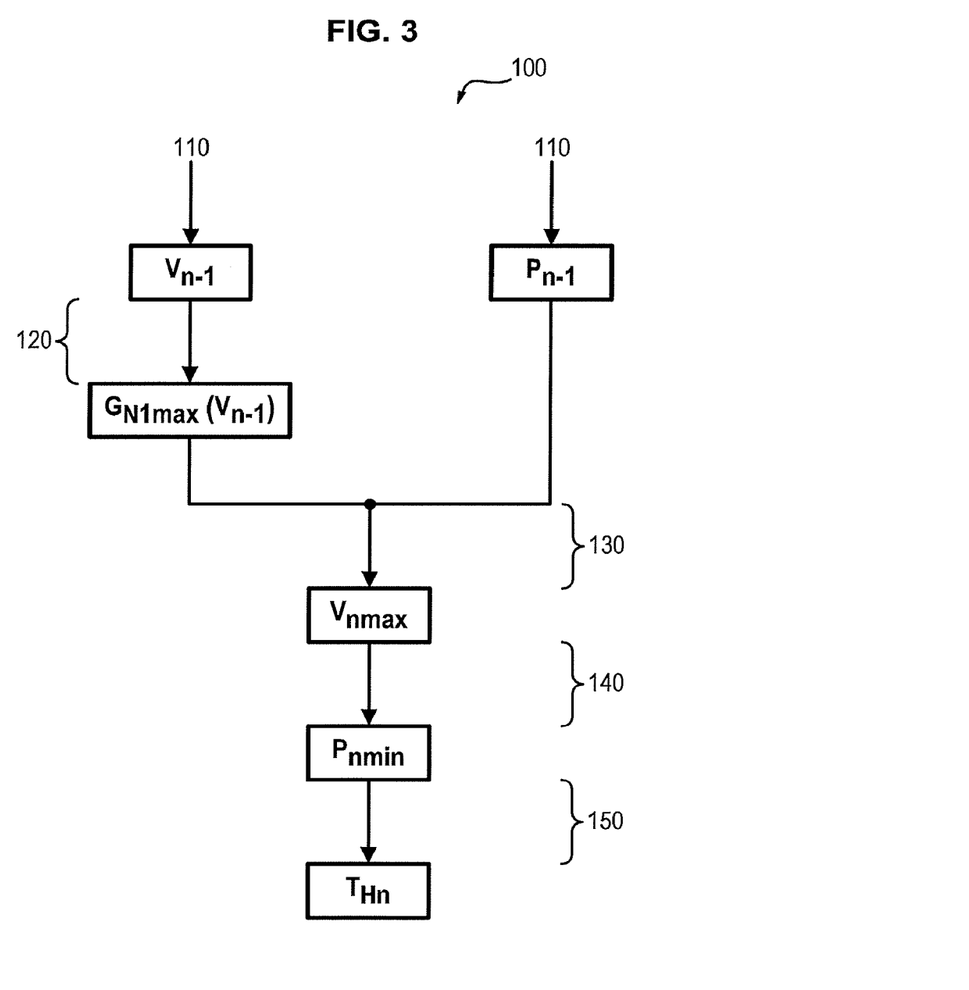
FIG. 3 shows schematically the steps in determining a value of switching continuation duration.

The details of the algorithm 100 for calculating the switching continuation duration $T_{Hn}$, to be used during the period $P_n$ of the window signal $S_C$, is shown in FIG. 3.

In step 110, the value $P_{n-1}$ of the preceding period is acquired (expressed for example in milliseconds) for the signal $S_C$, and the value $V_{n-1}$ of rotation speed of the phonic wheel corresponding to this preceding period (expressed for example in rotations per minute, rpm).

In step 120, starting with this speed value $V_{n-1}$, and using a predetermined maximum operating speed N1 gradient law $G_{N1max}$ expressed as a function of the operating speed, a maximum rotation speed gradient value $G_{N1max}(V_{n-1})$ is obtained. This gradient can be expressed in rpm per second. In step 130, a quarter of the period $P_{n-1}$, multiplied by the gradient $G_{N1max}(V_{n-1})$ is considered to obtain the maximum rotation speed variation over this quarter period. This maximum variation is added to the rotation speed value $V_{n-1}$ for the period $P_{n-1}$, to obtain the maximum speed $V_{nmax}$ over a quarter of the period $P_n$.

In the following step 140 a frequency $f_{nmax}$ of passage of the teeth of the phonic wheel is first obtained, based on this maximum speed value $V_{nmax}$. For example, if the speed is expressed in rpm, the value $V_{nmax}$ is divided by 60 (to obtain a value in rotations for second), then the value obtained is multiplied by the number of teeth of the phonic wheel, to obtain the tooth passage frequency $f_{nmax}$ of the phonic wheel. Finally, to obtain the corresponding period $P_{nmin}$, the inverse of the value $f_{nmax}$ is considered by applying continuously a saturation to avoid divisions by 0.

Upon completion of step 140, a minimal period $P_{nmin}$ is available for the processed windows signal $S_C$ following the measured period $P_{n-1}$. During a step 150, the switching continuation time $T_{Hn}$ is finally obtained, by dividing by 4 the value $P_{n-1}$.

This switching continuation duration $T_{Hn}$ is intended to be used as follows.

Figure 4:
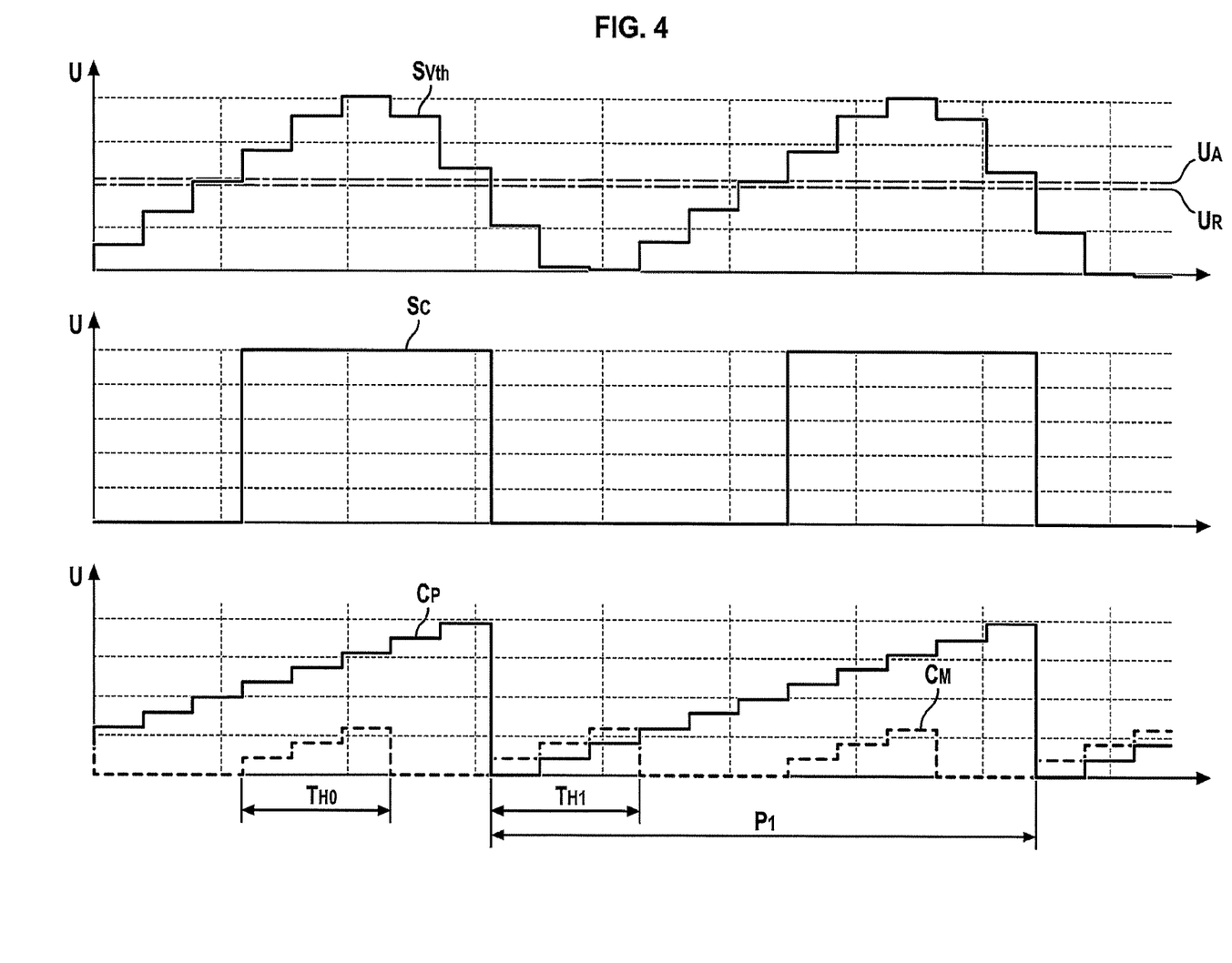
FIG. 4 illustrates a processing method applied to a theoretical voltage signal, to obtain a processed window signal with regular switching continuation.

Considered here is FIG. 4, in which, on a first axis, a simplified stepped voltage signal $S_{Vth}$ is shown as a function of time, and is windowed by a "Schmidt trigger" with restart threshold $U_R$ equal to 0, and with reset threshold $U_A$, strictly positive. On a second axis is visible the window signal $S_C$ obtained, and on a third axis is shown in superposition a period counting signal $C_P$, initialized at each descending front of the window signal $S_C$, and a switching continuation counting signal $C_M$ using the value $T_{Hn}$ of switching continuation duration obtained by the algorithm detailed previously. The specified time of the switching continuation signal $C_M$ is initiated after each switching (for a rising front and for a descending front) of the window signal $S_C$.

Here, the period $P_1$ initiated on a descending front of the signal $S_C$. The switching continuation counting signal $C_M$ is also initiated on this descending front, and elapses over a period $T_{H1}$ obtained as a function of the period $P_0$ that precedes it, with the algorithm illustrated by FIG. 3, then reset to 0 on conclusion of the period $T_{H1}$. On the abscissa of the time corresponding to the rising front which follows for the signal $S_C$, the counting of the switching continuation is again initiated, the counting of the period continuing at the same time.

The signal $S_C$ is locked when the value of $C_M$ is strictly greater than 0, so that the signal $S_C$ cannot commute again during the entire period $T_{H1}$, following the switching which initiates the counting of the period $P_1$.

In practice, this translates into the fact that the switches observed on the signal $S_C$ are spaced from one another by a period greater than the time $T_{Hn}$. This amounts to applying the assumption according to which, with regard to the gradient law $G_{N1max}$ used, a switching observed on the raw window signal brut $S_{CI}$ prior to the end of the switching continuation duration $T_{Hn}$ can only correspond to a crossing of the threshold $U_A$ or of the threshold $U_R$ caused by alternating parasitic noise added to the useful signal $S_U$. Thus a certain number of "parasitic switches" is eliminated on the processed window signal $S_C$.

Considering that the period $P_0$ is the first period observed for the signal $S_C$ (initialization phase of the operating speed measurement), it is not possible to calculate the value of the switching continuation time $T_{H0}$ from a value of the period of the signal $S_C$ previously measured, because such a previously measured value does not exist. Of it is still desired to apply processing eliminating "parasitic switches" on the first period $P_0$, it is possible to apply a value of the switching continuation time $T_{H0}$ obtained from a theoretical model, for example as a function of the operational conditions and of the dimensioning of the engine, or by applying a value $T_{H0}$ which corresponds to other measurements.

Figure 5:
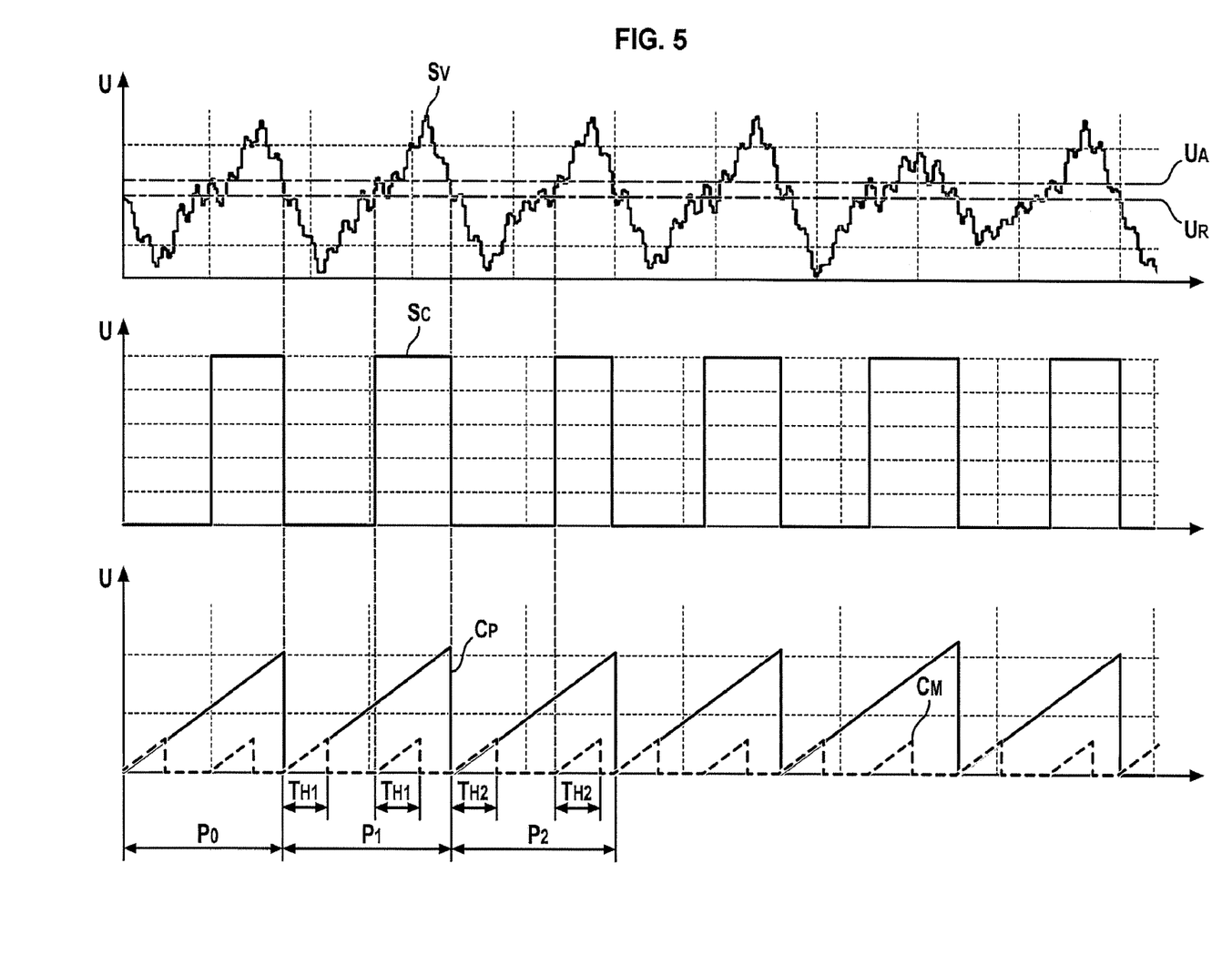
FIG. 5 illustrates the results obtained according to a processing method of one embodiment, on a shaft rotation speed signal, and particularly the processed window signal obtained and the successive periods measured.

The result observed on a real operating speed N1 measurement signal $S_V$, a voltage signal taken at the terminals of a phonic wheel sensor, is visible in FIG. 5. The physical quantities illustrated by the graphs of the three axes are the same as in FIG. 4.

In particular, during the first period $P_0$, almost immediately after the rising front of the window signal $S_C$, the signal $S_V$ passes below the restart threshold $U_R$, due to noise. However, the switching continuation counter $C_M$ being at a strictly positive value, this is not translated by a switching toward the low level of the window signal $S_C$. Likewise, a parasitic switching toward the low level of the window signal $S_C$ is avoided, during the second period $T_{H1}$ of switching continuation of the period $P_1$ of the signal $S_C$. One embodiment for a software implementation of the switching continuation, taking as input the raw window signal $S_{CI}$ at the output of the "Schmidt trigger" and delivering at its output a processed window signal $S_C$, is illustrated by the electronic block diagram of FIG. 6.

Figure 6:
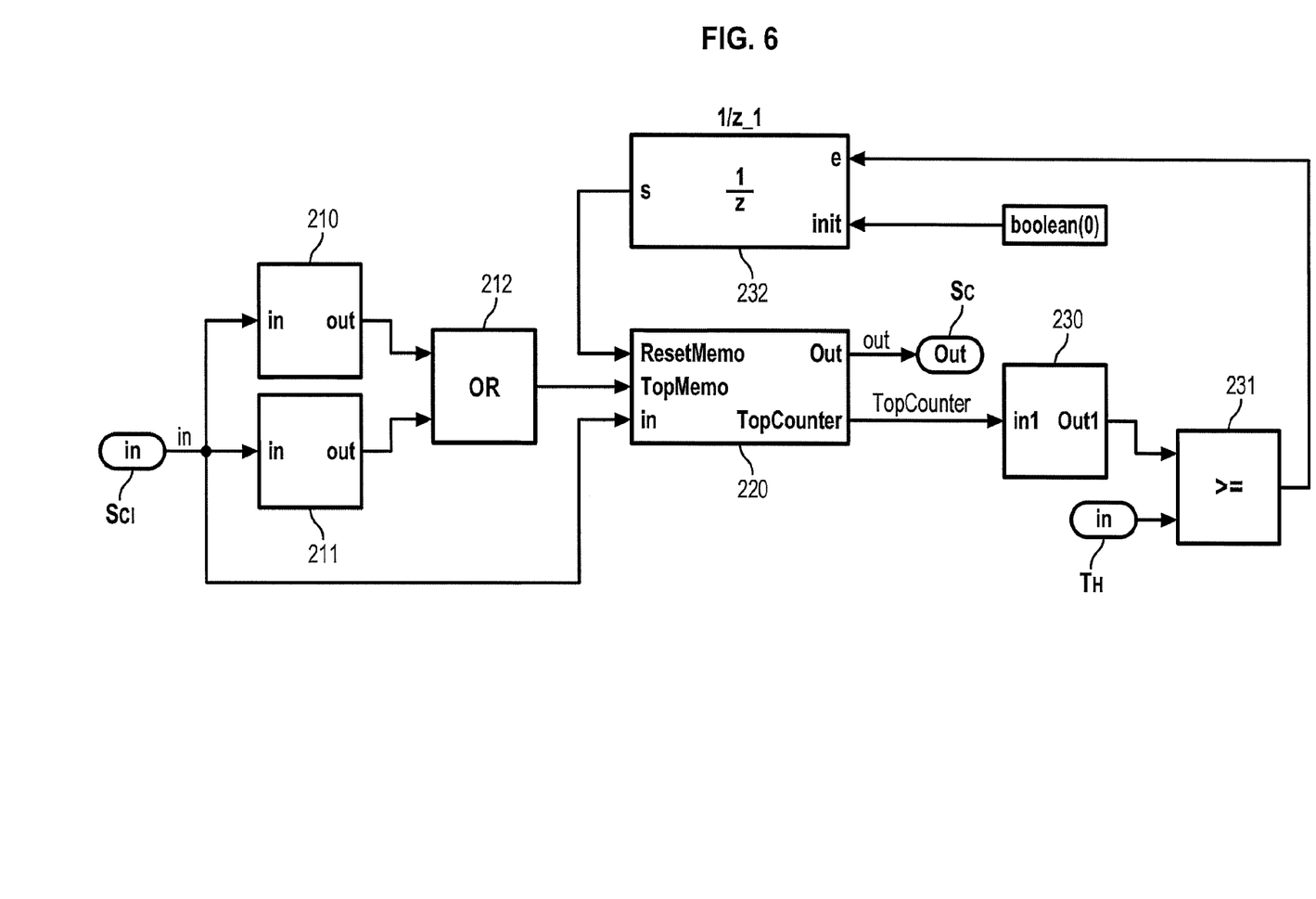
FIG. 6 is a block diagram of electronic functions implementing, according to one embodiment, the processing method illustrated in FIG. 4, downstream of the measurement of the rotation speed signal.

The raw window signal $S_{CI}$ is taken at the input of two units 210 and 211. The unit 210 delivers a Boolean which, at each rising front of the signal $S_{CI}$ (without it being possible to distinguish the rising fronts due to the useful signal and the "parasitic rising fronts") takes a value 1, and is equal to 0 the rest of the time. In other words, the output of the block 210 is a binary signal which identifies the instants where $S_{CI}$ has a rising front. The unit 211 delivers at the same time a Boolean which identifies the descending signals. At 212, an OR logical gate delivers a signal called TopMemo here, with a value 1 at instants where the signal $S_{CI}$ commutes, and value 0 otherwise. The unit 220 takes as its input, on the one hand the signal $S_{CI}$, and on the other hand the signal TopMemo. The unit 220 also takes as its input the value $T_H$ of the switching continuation duration calculated upstream, for the current period $P_n$. Moreover, the unit 220 contains a feedback loop: a signal ResetMemo is taken at the input of 220, this signal being a function of a signal TopCounter delivered at the output of 220, with the following operation.

A value 1 at an instant t of the signal TopMemo (therefore a switching of $S_{CI}$) causes, if the counter TopCounter is not already initiated, the locking, for the processed window signal $S_C$ delivered at the output of 220, of the value of $S_{CI}$ acquired at the instant t, until the instant $t+T_H$, as well as the initiation of the counter TopCounter. Thus the signal $S_C$ no longer commutes until $t+T_H$.

After the instant $t+T_H$ (when TopCounter is greater than or equal to $T_H$), the signal ResetMemo becomes equal to 1, and the window signal $S_C$ is no longer locked at the value of $S_{CI}$ at the instant t. Moreover, the counter TopCounter is reset to zero. Thus, on the one hand the signal $S_C$ can again commute, and on the other hand, if the signal $S_C$ commutes again, the counter TopCounter can be re-initiated.

The signal ResetMemo therefore has the value 1 immediately after the moment where the value of the counter TopCounter exceeds $T_H$, and 0 otherwise. The unit 230 allows the initiation of a counter TopCounter, and the unit 231 carries out the comparison between the value of the counter TopCounter and the value $T_H$. This value is then delayed by a delay operator 232 to deliver a feedback signal ResetMemo. A value 1 of the signal ResetMemo causes the resetting to zero of the counter TopCounter if its value is greater than $T_H$, allowing a new restart of the counter TopCounter during the next switching of $S_{CI}$.

On the other hand, if at the instant t there is a switching of $S_{CI}$ and of $S_C$, and if at the instant of the interval]t;t+$T_H$ [the signal TopMemo has again the value 1 (indicating a new switching of $S_{CI}$), ResetMemo remains equal to 0 and the counter TopCounter is not again initiated, because it was already initiated when the switching continuation duration $T_H$ was not yet expired.

Said new switching is therefore not taken into account in the processed signal $S_C$ delivered, which accomplishes the objective of the processing method, namely separating switches due to parasitic noise from the window signal $S_C$ on which a measurement of frequency of passage of the teeth of the phonic wheel can be accomplished.

Figure 7:
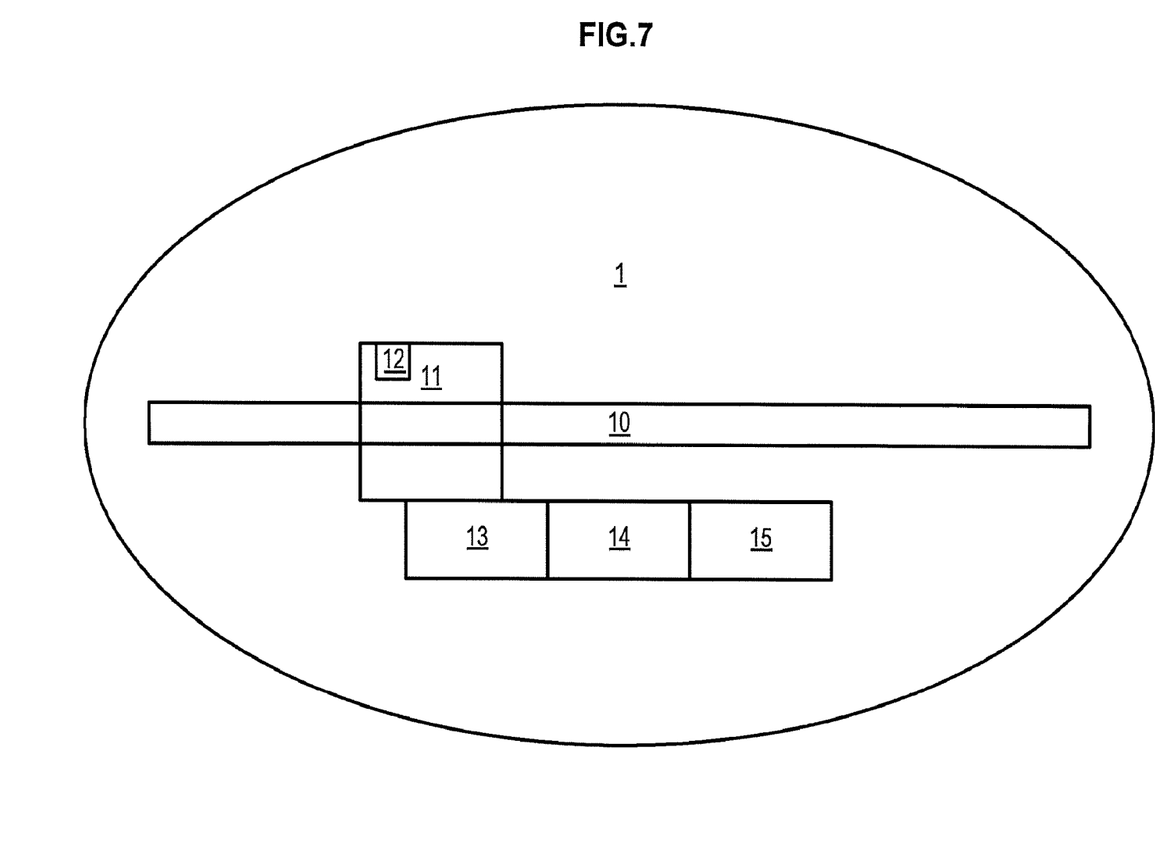
FIG. 7 shows schematically an aircraft engine comprising a rotating shaft and a rotation speed detection unit.

FIG. 7 shows schematically a turbomachine 1 comprising a rotating shaft 10 of the low-pressure body of which it is desired to determine the rotation speed N1. To this end, the engine 1 comprises a detection unit of the rotation speed of the shaft 10. The detection unit comprises a phonic wheel 11, screwed around the shaft 10 coaxially with the shaft 10. The phonic wheel is driven in rotation by the shaft 10, and has a plurality of regularly spaced teeth. Optionally, the wheel 11 comprises a singular tooth 12 different from the other teeth. One advantage of having a singular tooth 12 is to form angular points usable for the function of engine balancing. The detection unit also comprises a variable reluctance sensor 13, placed in the vicinity of the wheel 11, so that the passage of the teeth of the wheel 11 generates an alternating signal for detecting the rotation speed. The frequency of the detection signal thus generated is proportional to the rotation speed of the shaft. FIG. 7 also shows, associated with the variable reluctance sensor 13, an electronic circuit 14 of the detection unit, comprising a connection with the sensor 13 to receive the detection signal of the rotation speed, and accomplishing the windowing of said signal to give a raw window signal. As seen previously, the raw window signal thus produced by the circuit 14 can include parasitic switches due to noise. To avoid having said parasitic switches having an impact on the measurement of the rotation speed of the shaft 10, the detection unit further comprises a processing unit 15 including calculation means, a processor for example. The processing unit 15 is configured to implement the method shown in FIG. 3, to produce a processed window signal.

Alternatively or in combination, a rotation speed detection unit can be associated with a rotating shaft of the engine 1 other than a shaft of the low-pressure body.

The processing method described previously provides, on the basis of a maximum gradient law of the engine operating speed, a simple solution for considerably reducing in real time the influence of parasite noise (particularly noise of the alternating type, superimposed unpredictably on the useful signal) on the measurement of the engine operation speed. This solution requiring neither a reduction in the peak-to-peak amplitude of the useful signal, nor an increase in the voltage difference between the restart threshold and the reset threshold of the "Schmidt trigger" carrying out the windowing, it alters less the accuracy and the sensitivity of the measurement than known solutions from the prior art.

The invention claimed is:

1. A processing method of an alternating signal for detecting the rotation speed of a shaft of an aircraft engine, produced by a variable reluctance sensor and affected by parasitic measurement noise, from a raw window signal switching toward a low voltage level, respectively toward a high voltage level, in correspondence with the passage of the voltage of the alternating signal below a restart threshold, respectively above a reset threshold, the method comprising the following steps:
  calculating a processed window signal, based on the raw window signal, and using a switching continuation duration value below which a non-noisy portion of the alternating signal does not switch, said switching continuation duration value being calculated as a function of a rotation speed value of the shaft previously obtained; and
  measuring the rotation speed of the shaft, by measurement of the frequency of the processed window signal;
  wherein each switching toward the low level or toward the high level of the processed window signal triggers the locking of the processed window signal for a duration exactly equal to the switching continuation duration value previously calculated, so that switches of the un-processed window signal are not translated into switches of the processed window signal during said locking;
  the processed window signal no longer being locked once said duration exactly equal to the switching continuation duration value has expired.

2. The method according to claim 1, wherein the switching continuation duration value corresponds to a quarter of a minimum rotation period of the shaft at the time of measurement, said minimum period being calculated using a maximum gradient law of the rotation speed of the shaft.

3. The method according to claim 2, wherein a maximum gradient of rotation speed of the shaft for a given period, obtained according to the maximum gradient law of the rotation speed of the shaft, is a function of a rotation speed value obtained for a previous period.

4. The method according to claim 1, wherein the alternating rotation speed detection signal is transformed into a window signal by a Schmidt trigger.

5. The method according to claim 1, wherein, during an operating speed measurement initialization phase, a theoretical model of the engine operating speed is used to evaluate the switching continuation duration value.

6. A rotation speed detection unit of an aircraft engine shaft, comprising:
  a phonic wheel driven in rotation by the shaft, and having a plurality of regularly spaced teeth;
  a variable reluctance sensor placed in the vicinity of the phonic wheel, so that the passage of the teeth of the phonic wheel generates an alternating signal for detecting the rotation speed, a frequency of said alternating signal being proportional to the rotation speed of the shaft;
  an electronic circuit configured to carry out the windowing of the alternating signal into a raw window signal; and
  a processing unit configured to execute a method of claim 1, to supply a processed window signal as an output.

7. The detection unit according to claim 6, wherein the phonic wheel has a singular tooth, of which a shape and/or a dimension differs from those of the other teeth of the phonic wheel, allowing angular balancing points to be identified.

8. An aircraft engine comprising:
  a rotating shaft of which the rotation speed is to be measured; and
  a detection unit according to claim 6, comprising a phonic wheel screwed around the rotating shaft, coaxially with the rotating shaft.

* * * * *